(12) United States Patent
Kfir et al.

(10) Patent No.: US 10,540,466 B1
(45) Date of Patent: Jan. 21, 2020

(54) SYSTEMS AND METHODS FOR STREAMING WAVEFORM DATA DURING EMULATION RUN

(71) Applicant: CADENCE DESIGN SYSTEMS, INC., San Jose, CA (US)

(72) Inventors: Alon Kfir, San Jose, CA (US); Jennifer Lee, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 72 days.

(21) Appl. No.: 15/893,418

(22) Filed: Feb. 9, 2018

(51) Int. Cl.
*G06F 17/50* (2006.01)

(52) U.S. Cl.
CPC ........ *G06F 17/5036* (2013.01); *G06F 17/505* (2013.01); *G06F 2217/02* (2013.01); *G06F 2217/06* (2013.01)

(58) Field of Classification Search
CPC .. G06F 11/26; G06F 17/5027; G06F 2217/68; G06F 2217/86; G06F 9/455; G06F 17/50; G06F 17/5036; G06F 17/505; G06F 2217/02; G06F 2217/06; H04L 43/50; H04L 67/08; H04L 67/36; H04L 69/28
See application file for complete search history.

(56) References Cited

U.S. PATENT DOCUMENTS

2017/0140082 A1* 5/2017 Suresh ................... H04L 67/08
2018/0137031 A1* 5/2018 Jain ..................... G06F 11/3636

* cited by examiner

*Primary Examiner* — Vuthe Siek
(74) *Attorney, Agent, or Firm* — Eric L. Sophir; Dentons US LLP (57) ABSTRACT

An exemplary emulation computer may allocate a portion of its emulation memory for capturing probe data during a runtime of emulating a device under test (DUT). The emulation computer may instantiate a plurality of streaming probes from dynamic netlists provided by a user. The streaming probes may capture non-transitory internal signals within the DUT and transmit the captured non-transitory internal signals to the allocated portion of the emulation memory, which in turn may store the received signals as waveform data records. During the runtime of emulating the DUT, the emulation computer may receive an upload request for the waveform data records from a workstation computer. In response to the request, the emulation computer may transmit the waveform data records to the workstation computer. The emulation computer does not have to pause or stop the runtime of emulating the DUT while transmitting the data records to the workstation computer.

20 Claims, 3 Drawing Sheets

SYSTEMS AND METHODS FOR STREAMING WAVEFORM DATA DURING EMULATION RUN

TECHNICAL FIELD

This application relates generally to the field of electronic circuit design emulation, and more specifically to systems and methods for streaming waveform data during emulation runs.

BACKGROUND

Emulation systems may comprise hardware components, such as emulation chips and processors, capable of processor-based (e.g., hardware-based) emulation of logic systems, such as integrated circuits (ICs), application specific integrated circuits (ASICs), central processing units (CPUs), graphics processing units (GPU), field-programmable gate arrays (FPGAs), and the like. By executing various forms of programmable logic, the emulation chips may be programmed to mimic the functionality of nearly any logic system design that is undergoing testing and verification. In other words, emulation systems may be used for a functional verification of the logic system design. Processor-based emulation allows logic designers to prototype a logic system design, before a manufacturer expends resources manufacturing a logic system product based on the logic system design. An emulation system may receive a logic system design in a hardware description language (HDL), such as Verilog or VHDL. In the alternative or in addition, the emulation system may receive the logic system design in a proprietary language. The emulation system may also receive a pre-compiled logic system design in a suitable form based on the specification of the emulation system.

To debug a design being emulated, an emulation system may capture signals travelling between various components within the design during an emulation run. For example, the emulation system may capture a signal generated during the emulation run in a net interconnecting two components of the design. Popular debug methodologies rely heavily on analyzing the waveforms of the captured signals. The waveforms visually show, for instance, the binary value indicated by the captured signals or where the captured signals are changing or toggling the binary values. Capturing the signals may also be referred to as capturing waveform data because the captured data may be used by a workstation computer to render the waveforms of the captured signals.

While the conventional emulation technology allows for a concurrent waveform data capture during an emulation run, uploading the captured waveform data to a workstation computer requires the emulation run to pause or stop. Stopping emulation runs to upload captured data may result in a performance penalty. Because the data uploaded may be per cycle and thus, comprehensive, it takes time to process and render. Furthermore, the dedicated capture memory, for example, data capture card (DCC) memory, used by conventional emulation technology to receive waveform data during emulation run does not support operational modes that may not allow an emulation run to stop. An example of such operational mode is a logic analyzer mode, wherein the system is continuously running and data is captured at trigger. In addition, an emulation run may not stop if the design being emulated is interacting with a target external electronic circuit device that cannot be stopped. If the run period of the modes wherein the emulation run cannot be stopped is longer than the corresponding maximum capacity of the DCC memory, there may be a data overflow, and portions of captured data may be overwritten or lost. Conventional emulation technology also does not allow for probing of dynamically added parts of the design being emulated. In other words, conventional emulation technology is confined to probing of portions of an originally compiled design and cannot handle portions of the design that are added during an emulation run.

SUMMARY

What is therefore desired are emulation systems and methods that allow for uploading captured waveform data to a workstation computer without stopping an emulation run, and in a format that allows for a minimization of the amount of data transferred without loss of information. What is further desired are emulation systems and methods that allow for probing and capturing of waveform data from dynamic parts of the design system being emulated, i.e., those portions of the DUT and testbench that are added during the emulation run.

Embodiments disclosed herein solve the aforementioned problems and other technological problems. In particular, an exemplary emulation computer may allocate a portion of its emulation memory for capturing probe data during a runtime of emulating a device under test (DUT). The emulation memory may be allocated such that the portions that are in use at any given time are uploaded. The emulation computer may instantiate a plurality of streaming probes from dynamic netlists constructed to connect to user design signals. The dynamic netlists may be simple or complicated, such as to make it easier to construct meaningful user data, including using edge detectors to capture data on transitions. Additional dynamic netlists may be connected which provide information about the timestamp or whether the captured data was disabled previous to the current timestamp. The streaming probes may capture non-transitory internal signals within the DUT and transmit the captured signals to the allocated portion of the emulation memory, which in turn may store the received signals as waveform data records. During the runtime of emulating the DUT, the emulation computer may receive an upload request for the waveform data records from a workstation computer. The emulation computer may also transmit the waveform data records due to internal signals that indicate the user memory is approaching a particular memory address or that indicate a particular amount of emulation time or real time has passed. In response to the request, the emulation computer may transmit the waveform data records to the workstation computer. The emulation computer does not have to pause or stop the runtime of emulating the DUT while transmitting the data records to the workstation computer. The emulation waveform data may be further manipulated to render a meaningful display to the user at the workstation computer.

In an embodiment, a method for streaming waveform data in an emulation computer comprises allocating, by an emulation computer, a first portion of an emulation memory for storing waveform data captured by one or more probes; instantiating, by the emulation computer, a streaming probe formed by a dynamic netlist and configured to capture one or more non-transitory internal signals within a device under test (DUT) being emulated by the emulation computer; during runtime of emulating the DUT: capturing, by the streaming probe, a non-transitory internal signal including an edge transition of the non-transitory internal signal within the DUT; transmitting, by the steaming probe, the non-transitory internal signal to the first portion of the emulation memory to be stored as a waveform data record; and in response to the emulation computer receiving an upload request for the captured non-transitory internal signal: transmitting, by the emulation computer, the waveform data record to a workstation computer.

In another embodiment, a system comprises a non-transitory emulation memory configured to emulate memory functionality of one or more memory components of a device under test (DUT) being emulated by the emulation computer; a processor configured to: allocate a first portion of the emulation memory for storing waveform data captured by one or more probes; instantiate a streaming probe formed by a dynamic netlist and configured to capture one or more non-transitory internal signals within the DUT; during runtime of emulating the DUT: capture through the streaming probe a non-transitory internal signal including an edge transition of the non-transitory internal signal within the DUT; transmit through the streaming probe the non-transitory internal signal to the first portion of the emulation memory to be stored as a waveform data record; and in response to the processor receiving an upload request for the non-transitory internal signal: transmit the waveform data record to a workstation computer.

In an another embodiment, a computer readable non-transitory medium contains one or more computer instructions, which when executed by a processor cause the processor to allocate a first portion of an emulation memory for storing waveform data captured by one or more probes; instantiate a streaming probe formed by a dynamic netlist and configured to capture one or more non-transitory internal signals within a device under test (DUT) being emulated by the emulation computer; during runtime of emulating the DUT: capturing through the streaming probe a non-transitory internal signal within the DUT; transmit through the steaming probe the non-transitory internal signal to the first portion of the emulation memory to be stored as a waveform data record; and in response to the processor receiving an upload request for the captured internal signal: transmit the waveform data record to a workstation computer.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments of the systems, products, and methods disclosed herein describe a novel approach for capturing waveform data within a device under test (DUT) in an emulation device (or emulation computer). As opposed to conventional systems that use a dedicated DCC memory for probing the nets of the DUT, the emulation device disclosed herein may use an allocated portion of the emulation memory intended for emulating the DUT memories (sometimes referred to as user memory) itself. Using the allocated portion of the emulation memory may allow the emulation device to upload captured waveform data into a streaming waveform database or a workstation during an emulation run, unlike the conventional systems wherein the emulation run has to be stopped for uploading captured data. Dynamic netlists are downloaded during runtime to connect any object in the precompiled database to designated hookup points in the user memory. Logic in the dynamic netlists may allow for edge detectors for the objects such that data is stored on signal transitions. The user memories may be arranged into N-bit wide blocks, for example 64 bit wide blocks, such that useful portions of the user memories are uploaded. The data that is stored into the user memories are read and processed for display and storage. This processing can include further combination and reconstruction to be meaningful to the user, for example, in some compile configurations which simulate a faster user clock (hereafter referred to as 1× mode), data for two signals may be combined to form one user signal. Furthermore, the emulation device provides a novel functionality of allowing a user (a circuit designer, for example) to instantiate streaming probes using dynamic netlists during an emulation run. The instantiated streaming probes may be attached to pre-compiled modules of the DUT and/or dynamically instantiated register transfer level (DRTL) modules added to the DUT during an emulation run.

Using dynamic netlists to connect precompiled portions and/or dynamically added DRTL portions of the DUT to an allocated portion of the emulation memory allows an emulation device to use an underutilized hardware resource within the emulation device. Furthermore, the emulation device may upload the data in the emulation memory to the streaming waveform database as a callback function without stopping an emulation run. Additionally, a user can instantiate the streaming probes during an emulation run to capture waveform data from any internal object in the DUT. Therefore, the circuit defining the DUT does not have to be compiled and recompiled each time a streaming probe is instantiated.

As used herein, the term streaming may refer to concurrent uploading of the captured waveform data to a database or a workstation during an emulation run. Furthermore, the database that may receive the concurrently uploaded data may be referred to as streaming waveform database. The workstation may access the streaming waveform database to generate and render waveforms based upon data records stored in the streaming database. In addition, the term streaming probe may refer to a probe that has been instantiated to capture waveform data that may be concurrently uploaded to the streaming database. The waveform data captured by the streaming probe may be referred to as probe data or streaming waveform data. The emulation system disclosed herein may also support a non-streaming buffered mode based upon an input from the user.

Figure 1:
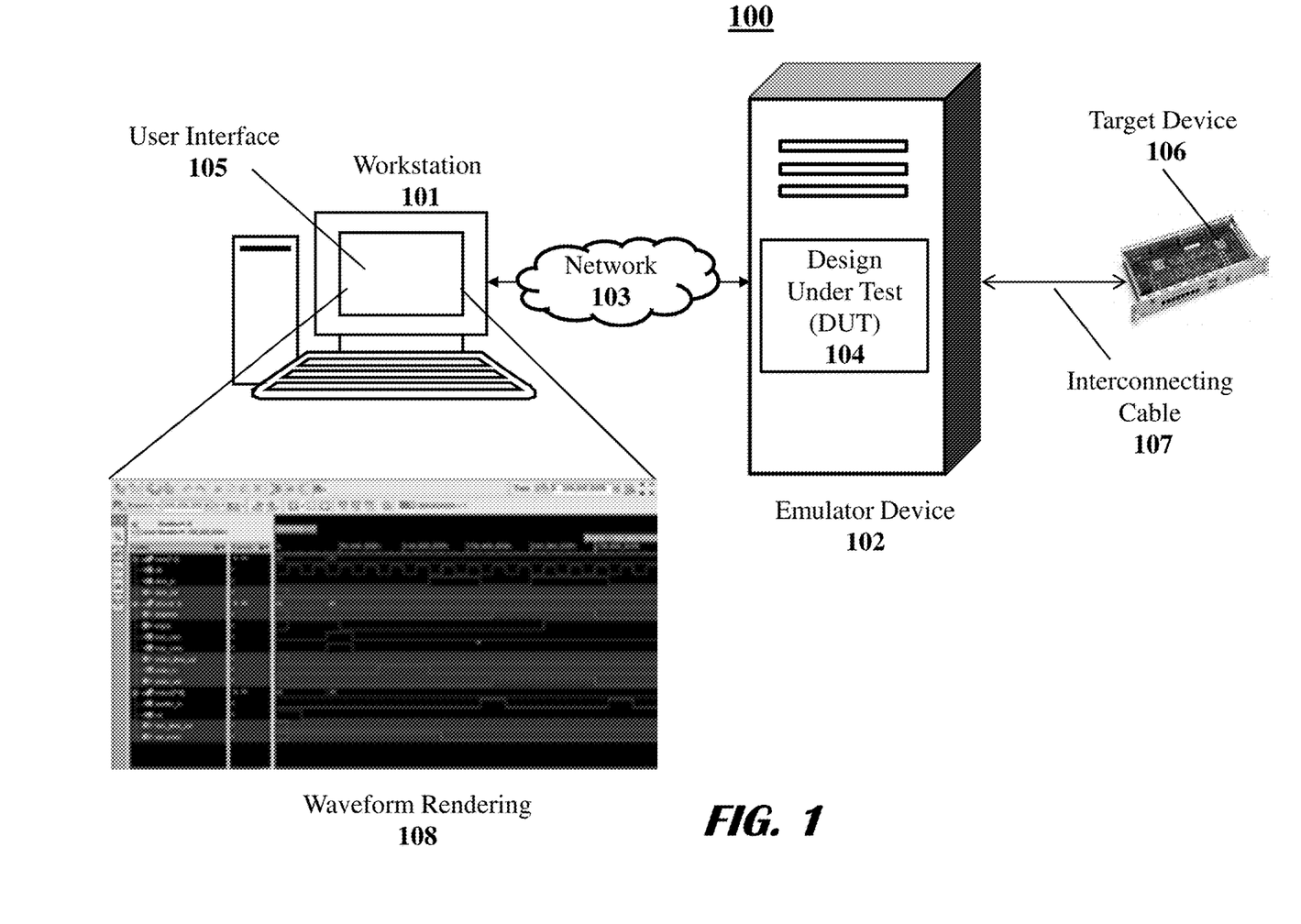
FIG. 1 shows an exemplary emulation system for streaming waveform data during an emulation run, according to an exemplary embodiment.

FIG. 1 shows an exemplary emulation system 100 for streaming waveform data during an emulation run, according to an exemplary embodiment. The emulation system 100 may include any number of computing devices, such as a workstation 101, an emulator device 102, and a target device 106. The emulator device 102 may emulate an electronic circuit design, shown as a device under test (DUT) 104 in FIG. 1. The workstation 101 may be connected to the emulator device 102 via hardware and software components of one or more networks 103. The emulator device 102 may be connected to the target device using an interconnecting cable 107. A network 103 may also connect various computing devices with databases or other components of the emulation system 100. Examples of the network 103 include, but are not limited to, Local Area Network (LAN), Wireless Local Area Network (WLAN), Metropolitan Area Network (MAN), Wide Area Network (WAN), and the Internet. The communication over the network 103 may be performed in accordance with various communication protocols, such as Transmission Control Protocol and Internet Protocol (TCP/IP), User Datagram Protocol (UDP), and IEEE communication protocols.

The workstation 101 may be any type of computing device capable of receiving, storing, compiling, and transmitting a design constructed using a hardware description language (HDL) such as VHDL, Verilog, or System Verilog. For example, the workstation 101 may be a computing device comprising a processor/microcontroller and/or any other electronic component that performs one or more operations according to one or more programming instructions. The examples of the computing device may include, but are not limited to, a desktop computer, a laptop computer, a personal digital assistant (PDA), a smartphone, a tablet computer, and the like. The workstation 101 may be configured to communicate with the emulator device 102 of the system 100 through the one or more networks 103, using wired and/or wireless communication capabilities. The workstation 101 may include a user interface 105 such as a graphical user interface (GUI) that renders an interactive, graphical representation of the design being tested and verified. The user interface 105 may provide interactive tools to a user to construct, modify, and compile the design being tested and verified. The user interface 105 may also provide interactive tools to a user to transmit/control the compiled design to the emulator device 102.

The workstation 101 may render in the user interface 105 data captured during a runtime of the DUT 104 in the emulator device 102. For example, a plurality of streaming probes in the DUT 104 may capture streaming waveform data, which may be uploaded to the workstation 101 by the emulator device 102. The workstation 101 may render the uploaded streaming waveform data as a waveform rendering 108. In addition to streaming waveform data, the waveform rendering 108 may include non-streaming waveform data captured using conventional techniques. In some implementations, the waveform rendering 108 may include a buffered streaming waveform data. The system 100 may allow a user to choose between different upload and rendering modes. For example, the emulator device 102 may capture streaming waveform data in the DUT 104 using one or more streaming probes, and the user may select a mode that buffers the captured streaming in an emulation memory within the emulator device 102 and empties the buffer at predetermined intervals or based on internal logic.

The emulator device 102 of the emulation system 100 may compile and execute emulation routines, which may be based on the logic of the design compiled and loaded into the emulator device 102. The emulator device 102 may include components such as emulation chips, logic boards, data buses, wiring interfaces, data lanes, non-transitory machine-readable media such as an emulation memory, and processors, among others. One or more components within the emulator device 102, such as emulation chips, may be programmed to process data inputs and generate data outputs according to instructions generated by compiling a schematic design ("netlist") of a particular logic system. A processor of the emulation system 100 may compile a machine-readable netlist file into executable code, which is then distributed as instruction sets to one or more emulation chips of the system. In some embodiments, the processor of the emulation system 100 may compile hardware specification described in a hardware description language such as VHDL or Verilog to generate the instruction sets. For each of the components of the emulation system 100 receiving an instruction set, the instructions may indicate which other component of the emulation system 100 is the source of a particular component's next data input, and which other component of the system 100 is the destination of the particular component's next data output.

The emulator device 102 may be logically organized into domains, which are subsets of components allocated to execute a particular emulation routine. Domains may be the smallest unit of hardware resources of the emulator device 102 that the emulation system 100 is capable of allocating to emulate a logic system design in association the target device 106 or a test vector. Each domain may comprise one or more components allocated by a configuration module to execute particular emulation routines while interacting with the target device 106 or the test vector. A domain (e.g., set of hardware resources) may be configured with execution parameters independent from both other domains and the rest of an emulation system 100 as whole. For example, each domain may comprise a separate execution clock that is independent from a system clock of the emulation system 100, and thus the domain may be independently schedulable from a user's perspective. It should be appreciated that a domain may be defined at any level of granularity within the emulation system 100, and may comprise any collection of hardware resources of the emulation system 100. Non-limiting examples of what constitutes a domain may include: one or more emulation chips, one or more processors on emulation chips, logical circuit boards, clusters of logical circuit boards, emulator memories, and any other collection hardware components that may be allocated to execute according to an independent clock. One ordinarily skilled in the art should appreciate the aforementioned complexity and other structural and functional complexity of the emulator device 102. However, for brevity, this disclosure describes the device under test (DUT) 104, the modules (both static and dynamic) contained therein, and streaming probes within the DUT 104.

The DUT 104 may be the logic system design being emulated in the emulator device 102. For example, the DUT 104 may comprise logic for components such as a central processing unit (CPU), a graphics processing unit (GPU), an application specific integrated circuit (ASIC), a field programmable gate array (FPGA). The DUT 104 may send outputs to and receives inputs from the target device 106. The DUT 104 may contain one or more aforementioned domains. In some instances, the DUT 104 may use almost all of the domains in the emulator device 104. In other instance, the DUT 104 may not use all of the domains of the emulator device 104. In some embodiments, the DUT 104 may comprise static modules which may be generated during a compile time of a design forming the DUT 104. In other embodiments, the DUT 104 may comprise one or dynamic register transfer level (DRTL) modules, which may be appended to the DUT 104 during an emulation runtime of the DUT 104.

Figure 2:
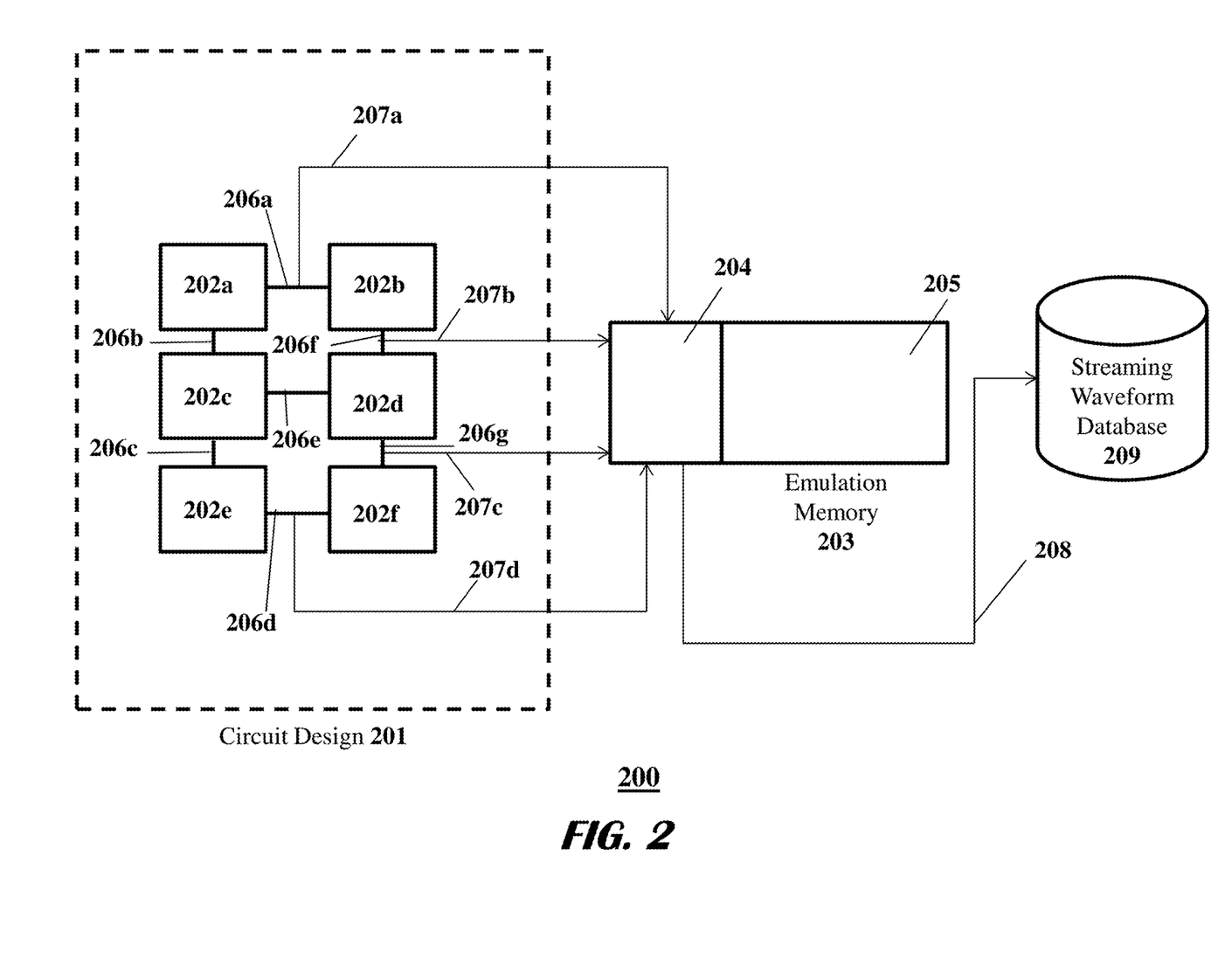
FIG. 2 shows an exemplary system for streaming waveform data during an emulation run, according to an exemplary embodiment.

FIG. 2 shows an exemplary system 200 for streaming waveform data during an emulation run, according to an exemplary embodiment. The system 200 may include a circuit design 201, an emulation memory 203, and a streaming waveform database 209. As the shown system 200 is merely exemplary, one or more components can be added to, subtracted from, and substituted without deviating from the scope of this disclosure.

The circuit design 201 may be a portion of a device under test (DUT) being emulated within an emulation device (alternatively, an emulation computer). The circuit design 201 may comprise a plurality of circuit components 202a, 202b, 202c, 202d, 202e, 202f and a plurality of nets 206a, 206b, 206c, 206d, 206e, 206f, 206g interconnecting the plurality of circuit components 202a, 202b, 202c, 202d, 202e, 202f. The plurality of circuit components 202a, 202b, 202c, 202d, 202e, 202f may include asynchronous circuit components such as an AND gate, an OR gate, a NOR gate, an XOR gate, a NAND gate, a multiplexer; and synchronous circuit components such as registers and flip-flops. The plurality of nets 206a, 206b, 206c, 206d, 206e, 206f, 206g may be wires between the plurality of circuit components 202a, 202b, 202c, 202d, 202e, 202f.

In the emulation device, the DUT containing the plurality of circuit components 202a, 202b, 202c, 202d, 202e, 202f and the plurality of nets 206a, 206b, 206c, 206d, 206e, 206f, 206g may be emulated by multiple types of hardware devices such as processors (not shown), multiplexers, wires, and memory devices. An exemplary memory device is shown in FIG. 2 as emulation memory 203. In other words, a user or a software module may load the circuit design forming the DUT into the components of the emulation device, and these components may implement the functionality of the circuit design. A user such as a circuit designer may then debug and verify the validity of the circuit design based upon detecting and analyzing the implemented functionality. More specifically, as detailed below, the user may capture signals in the plurality of nets 206a, 206b, 206c, 206d, 206e, 206f, 206g and analyze the signals to verify the validity of the circuit design.

The circuit design 201 may be comprised of one or more dynamic register transfer level (DRTL) modules. A DRTL module may be dynamically added to the DUT during the emulation run of the DUT. In other words, the DRTL module may not be a part of the compiled circuit design forming the DUT; but a module that may be compiled and appended within the DUT during the emulation run for the DUT. As shown herein, one or more of the plurality of circuit components 202a, 202b, 202c, 202d, 202e, 202f and the plurality of nets 206a, 206b, 206c, 206d, 206e, 206f, 206g may form a DRTL module. Conventional emulation systems designate fixed number of probes at fixed locations during compile time and therefore cannot handle DRTL modules in the DUT.

The emulation memory 203 may be a part of the emulation device emulating the DUT. The emulation memory 203 may be used by a user to emulate the memory part of the DUT. In other words, the emulation memory 203 may be a memory device configured to host a plurality of memory components within the DUT. However, the DUT may not use the entirety of the emulation memory 203 during an emulation run. Therefore, the user or the emulation device may allocate a portion of the emulation memory 203 for receiving probe data (or waveform data) from a plurality of streaming probes. In FIG. 2, the portion of the emulation memory 203 allocated for storing probe data is shown as 204; and the remaining portion of the emulation memory 203 implementing DUT memory functionality is shown as 205.

During an emulation run, the emulation device may instantiate a plurality of streaming probes 207. The streaming probes 207 may be formed by dynamic netlists. For example, a first dynamic netlist may form a first streaming probe 207a and a second dynamic netlist may form a second streaming probe 207b. The dynamic netlists forming the streaming probes may be added by the user to the circuit design 201 during an emulation run. Therefore, as DRTL modules are added to the circuit design 201, the user may add the dynamic netlists to instantiate the streaming probes 207 to capture non-transitory internal signals (or simply internal signals in short) in the DRTL modules. As shown herein, the circuit design 201 may be a DRTL module; and the streaming probes 207a, 207b, 207c, 207d may be capturing the signals in the respective internal nets 206a, 206f, 206g, 206d of the DRTL module.

The streaming probes 207 may also be instantiated for regular design nets. In other words, the streaming probes 207 are not confined to capturing signals within DRTL modules. As an example, the plurality of circuit components 202a, 202b, 202c, 202d, 202e, 202f and the plurality of nets 206a, 206b, 206c, 206d, 206e, 206f, 206g may form a non-DRTL static module, and the streaming probes 207a, 207b, 207c, 207d may be capturing the signals in the respective nets 206a, 206f, 206g, 206d in the static module. Even though the static module was available during compile time for instantiating and attaching a streaming probe, the user may have decided that such probe was unnecessary during compile time. However, during runtime the user may determine, based upon the behavior of the DUT that a section of the DUT has to be probed and instantiate the streaming probes 207 at the section during the emulation run.

The streaming waveform database 209 may receive the waveform data stored at the allocated portion 204 of the emulation memory through a connection 208. In some implementations, the emulation device may upload the waveform data stored at the allocated portion 204 to the streaming waveform database 209 in response to receiving an upload request from a workstation (not shown). In some instances, the emulation computer may receive a request for a non-streaming mode, i.e. the allocated portion 204 of the emulation memory should hold the waveform data until another upload request is received. In these instances, the allocated portion 204 may behave as a buffer, erasing older waveform data to make space for newer waveform data.

Figure 3:
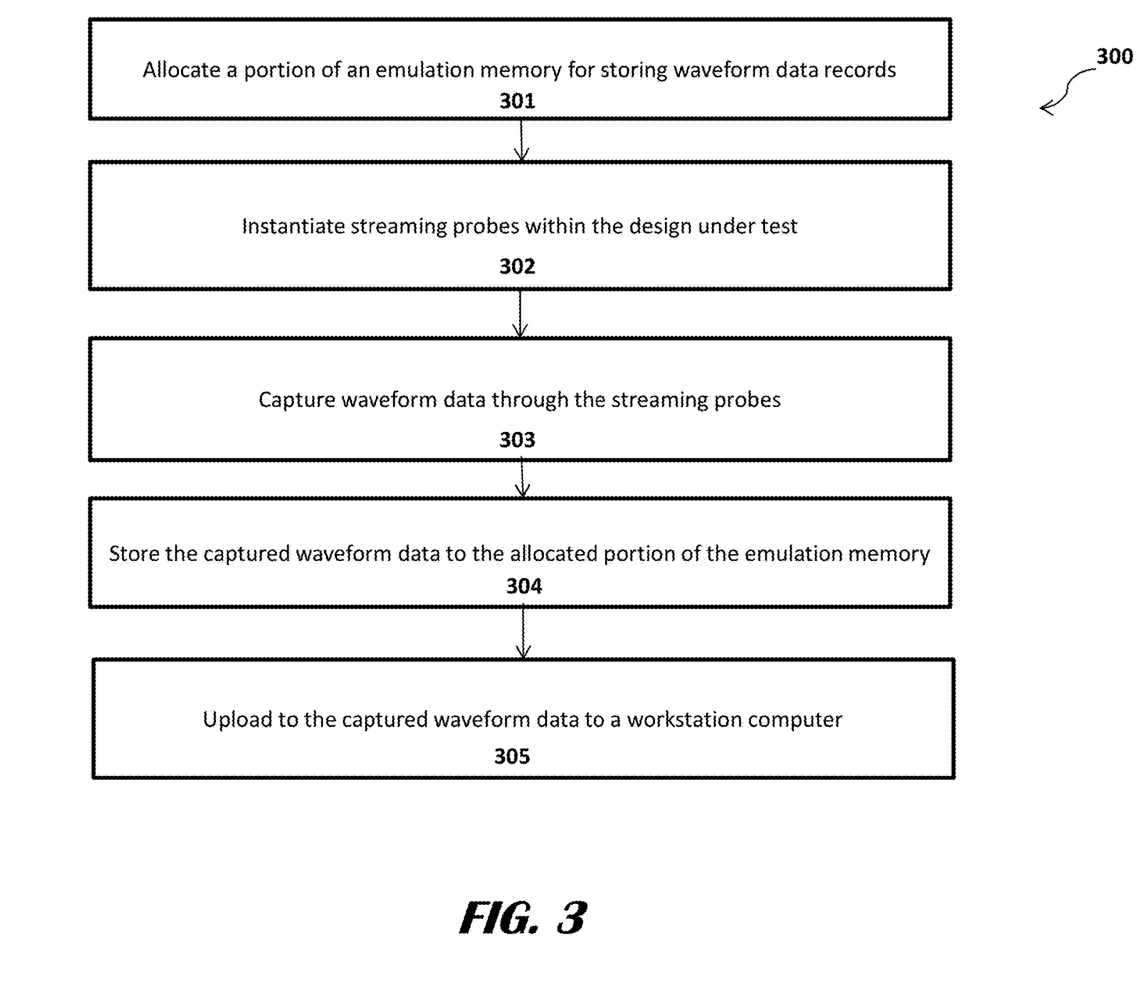
FIG. 3 shows an exemplary method streaming waveform data during an emulation run, according to an exemplary embodiment.

FIG. 3 shows an exemplary method 300 streaming waveform data during an emulation run, according to an exemplary embodiment. Although multiple computer systems and multiple databases may implement the steps of the method 300, this description details, for brevity, an emulation computer (also referred to as an emulation device) implementing the steps. Furthermore, the steps described herein are merely exemplary and addition, subtraction, and substitution of one or more steps in the method 300 should be considered within the scope of this disclosure.

In a first step 301, the emulation computer may allocate a portion of an emulation memory for storing waveform data records. The emulation memory, as described herein, may be a memory in the emulation computer configured to emulate various memory components in an electronic circuit design forming a device under test (DUT) in the emulation computer. In other words, the emulation computer may use the emulation memory to implement the functionality of the memory components of the DUT. The emulation memory may be sometimes referred to as a user memory. In most cases, the emulation memory may remain an underutilized hardware resource, i.e. the DUT may utilize only a portion of the emulation memory.

In some embodiments, the emulation computer may receive an instruction from a user to allocate a portion of the emulation memory for storing waveform data records. The instruction may contain one or more parameters indicating the size of the portion of the emulation memory to be allocated. For example, the instruction may contain depth parameter and/or width parameter of the portion to be allocated. The depth parameter indicates the number of words that can be stored in the portion to be allocated. A word may correspond to one sample of waveform data to be received from the DUT during emulation. The width parameter indicates the number of streaming probes that the portion to be allocated is configured to handle during emulation. The emulation computer system may receive the parameters through a user interface. For instance, the emulation system may render a text based interface for a user to enter executable scripts containing the parameters indicating the size of the portion of the emulation memory to be allocated. In other instances, the emulation system may render a graphical user interface for the user to enter the parameters using one or more graphic objects such as icons or buttons. In an absence of input from the user, the emulation computer system may allocate a default portion of the emulation memory. For example, the emulation computer, by default, may allocate a portion with a depth of 262,144 (256K) words and width of 64 bits. In some embodiments, the emulation computer may segment the allocated portion of the emulation memory to a plurality of buffers of a predetermined width, for example 64 bits, such that the buffers that are used are later uploaded to a workstation computer. The emulation computer may re-arrange the dynamic netlists by deleting and adding again to different hookup points as needed to minimize the number of buffers to be uploaded to the workstation computer. In other words, to minimize the number of buffers needed, the emulation computer may reassign the usage of buffers by deleting dynamic netlists from a first set of buffers and add the deleted dynamic netlists to a second set of buffers.

In a next step 302, the emulation computer may instantiate streaming probes within the device under test (DUT). The emulation computer may instantiate the streaming probes from respective dynamic netlists created based on instructions from the user. During runtime, the user may specify the design portions of interest for probing, and the emulation computer may generate the dynamic netlists based on those specifications. In some embodiments, the emulation computer may instantiate the streaming probes to capture the signal in the dynamic register transfer logic (DRTL) components in the DUT. In other embodiments, the emulation computer may instantiate the streaming probe to capture the precompiled components within the DUT. In some instances, the emulation computer may instantiate the streaming probes during the runtime of emulating the DUT. In other instances, the emulation computer may instantiate the streaming probes while compiling the design forming the DUT. In other words, the emulation computer may compile one or more streaming probes together with the design forming the DUT.

In a next step 303, the emulation computer may capture waveform data through the streaming probes. The streaming probes may be connected to a plurality of nets within the DUT and may capture the signals traveling through the respective nets. In some implementations, streaming probes may capture waveform data in selected clock cycles when there is some activity in the nets connected to the streaming probes. In other implementations, the streaming probes may capture the waveform data for all clock cycles. The waveform data may include, for example, edge transitions of the signals in the respective nets.

In a next step 304, the emulation computer may store the captured waveform data to the allocated portion of the emulation memory. In other words, the streaming probes may transmit the captured the waveform data to the allocated portion of the emulation memory, which may then store the received waveform data.

In a next step 305, the emulation computer may upload the streaming waveform signals to the workstation computer. For instance, the emulation computer may receive an instruction from the workstation computer that the data is required to render a waveform in the workstation computer; and the emulation computer may transmit the data to the workstation computer. In other instances, the emulation computer may upload the streaming waveform data in response to one or more internal periodic signals based on the internal logic of the emulation computer or in response to one or more memory address watermark signals that may indicate that the allocated portion of the emulation memory is approaching full. The workstation computer may then render the received streaming waveform data in user viewable formats. For example, the workstation computer may reconstruct signals from the streaming waveform data and then render the signals in a graphical user interface (GUI). The reconstructed signals may include, for example, virtual clock signals, virtual user signals, and 1× mode signals.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims. Furthermore, qualifiers "a" and "an" before a logical block, a module, a circuit, and an algorithm are not intended to be limiting, and multiple such components should be considered to be within the scope of this disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for streaming waveform data in an emulation computer, the method comprising:
   allocating, by an emulation computer, a first portion of an emulation memory for storing waveform data captured by one or more probes;
   instantiating, by the emulation computer, a plurality of streaming probes formed by corresponding dynamic netlists and configured to capture one or more non-transitory internal signals from a plurality of nets within a device under test (DUT) being emulated by the emulation computer;
   during runtime of emulating the DUT:
      capturing, by the plurality of streaming probes, the one or more non-transitory internal signals including corresponding edge transitions of the one or more non-transitory internal signals within the DUT;
      transmitting, by the plurality of steaming probes, the one or more non-transitory internal signals to the first portion of the emulation memory to be stored as one or more waveform data records; and
      in response to the emulation computer receiving an upload request for the captured non-transitory internal signal:
         transmitting, by the emulation computer, the one or more waveform data records to a workstation computer.

2. The method of claim 1, further comprising:
   in response to the emulation computer receiving one or more allocation parameters comprising at least one of a depth parameter and a width parameter via a user interface in the workstation computer:
      allocating, by the emulation computer, the first portion of the emulation memory based on the one or more allocation parameters; and
   in response to the emulation computer not receiving the one or more allocation parameters:
      allocating, by the emulation computer, the first portion of the emulation memory based on default allocation parameters.

3. The method of claim 1, further comprising:
   segmenting, by the emulation computer, the allocated first portion of the memory into a first plurality of buffers of a predetermined width;
   receiving, by a first set of buffers of the first plurality of buffers, the one or more non-transitory internal signals;
   storing, by the first set of buffers, the one or more plurality of non-transitory internal signals as the one or more waveform data records;
   in response to the emulation computer receiving the upload request for the captured one or more non-transitory internal signals or receiving a non-transitory internal logic signal generated based upon a time period or an address value:

transmitting, by the emulation computer, the one or more waveform data records from the first set of buffers to the workstation computer; and deleting, by the emulation computer, the dynamic netlists from the first set of buffers and adding the deleted dynamic netlists to a second set of buffers in the first plurality of buffers to reassign the usage of buffers, whereby the number of buffers needed is minimized.

4. The method of claim 1, wherein the plurality of streaming probes are configured to capture edge transitions of the one or more non-transitory internal signals within the DUT.

5. The method of claim 1, further comprising:

appending, by the emulation computer, a dynamic register transfer level (DRTL) module to the DUT during the runtime of emulating the DUT.

6. The method of claim 5, wherein at least one of the one or more non-transitory internal signals is generated within the DRTL module or generated with a precompiled portion of the DUT.

7. The method of claim 1, wherein the emulation computer transmits the one or more waveform data records to the workstation computer in response to one or more internal non-transitory logic signals generated based upon a time period or in response to a memory address watermark signal from the first portion of the emulator memory indicating that the first portion of the emulation memory is approaching full.

8. The method of claim 1, wherein at least one of the plurality of streaming probes is instantiated during the runtime of emulating the DUT.

9. The method of claim 1, wherein at least one of the one or more non-transitory internal signals is captured from a net in the DUT.

10. The method of claim 1, wherein the workstation computer renders the one or more waveform data records in user viewable format by reconstructing the one or more non-transitory internal signals and reconstructing at least one of virtual clock signals, virtual user signals, 1× mode signals based on data records received from the first portion of the emulation memory.

11. A system comprising:

a non-transitory emulation memory configured to emulate memory functionality of one or more memory components of a device under test (DUT) being emulated by an emulation computer;

a processor configured to:

allocate a first portion of the emulation memory for storing waveform data captured by one or more probes;

instantiate a plurality of streaming probes formed by corresponding dynamic netlists and configured to capture one or more non-transitory internal signals from a plurality of nets within the DUT;

during runtime of emulating the DUT:

capture through the plurality of streaming probes the one or more non-transitory internal signals including edge transitions of the one or more non-transitory internal signals within the DUT;

transmit through the plurality of streaming probes the one or more non-transitory internal signals to the first portion of the emulation memory to be stored as one or more waveform data records; and         in response to the processor receiving an upload request for the one or more non-transitory internal signals:

transmit the one or more waveform data records to a workstation computer.

12. The system of claim 11, wherein the processor is further configured to:

in response to the processor receiving one or more allocation parameters comprising at least one of a depth parameter and a width parameter via a user interface in the workstation computer:

allocate the first portion of the emulation memory based on the one or more allocation parameters; and in response to the processor not receiving the one or more allocation parameters:

allocate the first portion of the emulation memory based on default allocation parameters.

13. The system of claim 11, wherein the processor is further configured to:

segment the allocated first portion of the memory into a first plurality of buffers of a predetermined width;

instruct a first set of buffers of the first plurality of buffers to receive the one or more non-transitory internal signals;

instruct the first set of buffers store the one or more non-transitory internal signals as the one or more waveform data records;

in response to the processor receiving the upload request for the captured one or more non-transitory internal signals or receiving a non-transitory internal logic signal generated based upon a time period or an address value:

transmit the one or more waveform data records from the first set of buffers to the workstation computer; and delete the dynamic netlists from the first set of buffers and add the deleted dynamic netlists to a second set of buffers in the first plurality of buffers to reassign the usage of buffers, whereby the number of buffers needed is minimized.

14. The system of claim 11, wherein the plurality of streaming probes are configured to capture edge transitions of the one or more non-transitory internal signals within the DUT.

15. The system of claim 11, wherein the processor is further configured to:

append a dynamic register transfer level (DRTL) module to the DUT during the runtime of emulating the DUT.

16. The system of claim 15, wherein at least one of the one or more internal signals is generated within the DRTL module or generated with a precompiled portion of the DUT.

17. The system of claim 11, wherein the processor is configured transmit the one or more waveform data records to the workstation computer in response to one or more internal non-transitory logic signals generated based upon time period or in response to a memory address watermark signal from the first portion of the emulator memory indicating that the first portion of the emulation memory is approaching full.

18. The system of claim 11, wherein at least one of the plurality of streaming probes is instantiated during the runtime of emulating the DUT.

19. The system of claim 11, wherein the workstation computer is configured to render the one or more waveform data records in user viewable format by reconstructing the one or more non-transitory internal signals and reconstructing at least one of virtual clock signals, virtual user signals, 1× mode signals based on data records received from the first portion of the emulation memory.

20. A computer readable non-transitory medium containing one or more computer instructions, which when executed by a processor cause the processor to:
   allocate a first portion of an emulation memory for storing waveform data captured by one or more probes;
   instantiate a plurality of streaming probes formed by corresponding dynamic netlists and configured to capture one or more non-transitory internal signals from a plurality of nets within a device under test (DUT) being emulated by an emulation computer;
   during runtime of emulating the DUT:
      capturing through the plurality of streaming probes the one or more non-transitory internal signals within the DUT;
      transmit through the plurality of steaming probes the one or more non-transitory internal signals to the first portion of the emulation memory to be stored as one or more waveform data records; and
   in response to the processor receiving an upload request for the captured one or more non-transitory internal signals:
      transmit the one or more waveform data records to a workstation computer.

* * * * *